Patented Oct. 9, 1928.

1,687,314

UNITED STATES PATENT OFFICE.

HERBERT WILLIAM ROBINSON, OF BIRMINGHAM, AND DERIC WILLIAM PARKES, OF WEST BROMWICH, ENGLAND.

PROCESS FOR RESOLVING EMULSIONS OF TAR OR OIL.

No Drawing. Application filed February 23, 1927, Serial No. 170,413, and in Great Britain March 30, 1926.

The present invention relates to the separation or recovery of tars or oils from aqueous emulsions or suspensions containing those substances.

According to the present invention, a quantity of a finely divided solid or powder is brought into intimate contact with an aqueous emulsion or suspension containing tar or oil at such a temperature that one of the phases of the emulsion is agglomerated into a thick solid mass. This allows the other phase to separate out and to rest on the top of the thick mass. Preferably the powder is added to the emulsion or suspension and is so chosen and the temperature so arranged that the powder passes into and agglomerates that phase of the emulsion which is of relatively no value, that is to say, the water. It is possible, however, by suitable alteration of the conditions to cause first one phase and then the other to separate on top. In particular in the case of emulsions and suspensions containing a large proportion of water, the powder may first be added at an ordinary temperature when the water will separate out on top. The addition of further emulsion together with heating then causes a reversal of the phases and the tar or oil will separate on top. By suitable variation of the proportions by weight of the emulsion or suspension and the powder, the amount of oil or tar recovered may be made greater or less and will contain more or less water. In general, it is found that emulsions or suspensions containing from 30-35 per cent of water are the most suitable for treatment according to the invention, and that they are best treated by the addition of powder with heating when the oil will separate out at once. The heating may be carried out up to a temperature of about 100° C. Emulsions or suspensions having as much as 40 per cent of water may conveniently be treated by the same method, but in the case of emulsions or suspensions having more than 40 per cent of water the best treatment consists in the initial separation of the water in the cold together with the later addition of more of the emulsion or suspension and subsequent heating as described above. Emulsions having different proportions of water may conveniently be blended together so as to give a mixture, the water content of which approximates to 30-35 per cent.

It is preferred to use in connection with the processes described above powders which are easily wetted by water, such as granite dust or slate dust, and of these it has been found that air-separated granite dust is the most satisfactory material. It is found, however, that calcium carbonate in the form of powdered marble may also be used, but that a chemically prepared material does not give satisfactory results.

The term "air separated rock dust" hereinafter used in the specification and claims is accordingly to be interpreted broadly as denoting a finely powdered rock, granite, slate, or the like, which may be actually air separated or separated in any other desired manner to a similar fineness.

Granite dust which has already been used in the process may be revivified and employed to take up water or oil according to the conditions, but in this case a slightly larger quantity of powder is required than when fresh powder is used. This revivifying of the granite dust may be effected, for example, by heating to a low temperature, preferably below 100° C. until the water content is reduced to about 1 per cent. Preferably before the heating the wet dust is allowed partially to dry by settlement for a period. In order to purify the sludge which results from the improved treatment of tar emulsions and dirty creosote emulsions, it is found better first to wash the sludge with light creosote or water, or both of these before drying the powder.

It is found, however, that a fresh powder, that is to say one that has not been used before, will only pass into the water so that the oil separates out on top, but that a powder which has been used two or three times and has been revivified will agglomerate the oil directly part of the water separating out on top in this case. On heating, the phases are reversed so that the powder agglomerates the water, while the oil separates on top. In any event, however, direct water separation only occurs when emulsions are treated having a high percentage of water, that is to say 40 per cent or more.

In the processes according to the present invention no other agent than the powder is necessary for breaking the emulsion or for coagulating the emulsifying agent.

In order that the invention may be clearly understood and readily carried into effect, further details will now be given of various processes carried out in accordance with the invention. It is desired to separate the creosotes from a creosote-water emulsion containing 40 per cent of water which forms the dispersed phase, and also containing some finely-divided carbon and other solids. 500 parts by weight of this emulsion are heated to 60° C. and then poured on to 380 parts by weight of fine granite dust graded by means of an air current. The whole is mixed together and the temperature again raised to about 60° C. After maintaining the temperature approximately constant at that value for a few minutes, the mixture separates out and 242 parts by weight of the oil containing less than 0.25 per cent of water are obtained. The amount obtained thus represents 48.4 per cent of the total original emulsion which, as mentioned above, contains something slightly below 60 per cent of creosote.

In this process the amount of water remaining in the separated oil may be controlled by varying the amount of powder employed. For example, if the 500 parts by weight of the emulsion above referred to were mixed with 280 parts by weight of the powder, then 260 parts by weight of the oil would be obtained and would contain about 1.5 per cent of water. This amount of oil, of course, represents 52 per cent of the original emulsion. Again, in another case 900 parts by weight of an emulsion containing 33 per cent of water may be mixed with 600 parts by weight of fine granite dust and heated to between 90 and 100° C. As soon as the oil begins to separate, a further 100 parts by weight of the emulsion are added, making 1000 parts by weight of emulsion treated. In a few minutes 615 parts by weight of oil separate, this being a yield of 91.8 per cent of the oil in the emulsion.

The following are examples of separations where part of the water is first separated, whereupon by heating and adding more emulsion the phases are reversed and the whole of the oil is then separated:—

400 parts by weight of emulsion containing 57 per cent of water are mixed in the cold with 456 parts by weight of the above-mentioned powder which has been previously used twice in separating water.

Without any heating 128 parts by weight of water separate and rise to the top. The residue is a stiff paste and shows no signs of separation on heating to 70° C.

110 parts by weight more emulsion are then added and the whole again heated to 70° C., when 176 parts by weight of oil separate—this is equivalent to 35 per cent of the total emulsion or 82 per cent of the non-aqueous portion of the emulsion.

In another example, 500 parts by weight of the above emulsion are mixed in the cold with 456 parts by weight of the same powder, when 180 parts by weight of water separate, The residue is again very stiff and shows no signs of separating. A further 100 parts by weight of emulsion making 600 parts by weight in all are added and the whole heated to 70° C. 208 parts by weight of oil separate. This is equivalent to 34.8 per cent of the emulsion taken, or 80.5 per cent of the non-aqueous portion of the emulsion. In both cases the separated oil contains only a trace of water. This method of working has the advantage that a given amount of emulsion of high water content requires very much less powder for its separation. Examples of processes in which the same powder is used repeatedly, being revivified after each use, will now be given.

In one case 600 parts by weight of powder were taken and used 21 times in all on varying amounts of emulsions, the total amount of emulsion treated being 10602 parts by weight, containing 60.1 per cent of water. The amount of oil recovered from this total of emulsion was 82.8 per cent by volume of the original oil content, this being equivalent to 1.707 lbs. of powder per gallon of oil recovered. In this case direct separation of the water occurred during the fourth use of the powder and afterwards.

In another case an emulsion containing 12 per cent of water was treated in a series of operations, 420 parts by weight of powder being used and the total amount of the emulsion treated being 12670 parts by weight. The powder was used 11 times being revivified after each use. The yield of oil by volume was 99.1 per cent and this was equivalent to 0.38 lbs. of powder per gallon of oil recovered.

The improved process is particularly useful in resolving heterogeneous emulsions and suspensions of water in oil, such as are met with in the oil industry, in tar works and gas works. In many cases met with in practice, the creosote or tar is of about the same specific gravity as water so that even when the emulsion is broken by other known methods very considerable difficulty is usually experienced in obtaining a good separation. By the novel method according to the present invention, the high specific gravity of the semi-solid agglomerated mass overcomes these difficulties.

As mentioned above it is found that the most suitable proportion of water in the emulsion or suspension is 30–35 per cent and that this may be obtained, where it is not already present, by blending. Similarly gas tar and coke oven tar emulsions may be blended with creosote emulsions or with water-gas tar emulsions, since these latter act in the same way as creosote emulsions. For example an emulsion containing 6.5 per cent of water may be blended with one containing 72.75 per cent of water so that the product contains 33 per cent of water. In such a case the yield of oil is 96 per cent requiring only 0.7 lbs. of powder per gallon of oil recovered compared with 1.7 lbs. of powder per gallon and a yield of 82.8 per cent of the oil when the emulsion containing 72.75 per cent of water was treated alone.

Again, an emulsion containing 49 per cent of water was blended with one containing 16 per cent of water to give a product containing 27 per cent of water. The treatment of the first-mentioned emulsion alone required over 60 lbs. of powder per gallon of oil recovered and yielded 75 per cent of its oil, and the treatment of the second-mentioned emulsion alone required 0.66 lbs. of powder per gallon of oil and gave a yield of 96.95 per cent. The blended product required 0.62 lbs. of powder per gallon of oil recovered and gave a yield of 94 per cent of the oil.

In the case of emulsions or suspensions which are strongly alkaline in reaction, it is preferable to render them slightly acid either before or during the treatment. One method of accomplishing this consists, for example, in saturating them with carbon dioxide, sulphur dioxide or flue gases.

Further, the novel process according to the present invention may be utilized for the treatment of crude gas tars containing an abnormal amount of aqueous liquor in suspension before the distillation process. This results in the removal of ammonium chloride, hydrochloric acid, and other corrosive substances contained in the liquor so that the corrosion of the tar stills by the tar is much reduced.

Having thus described our invention, what we do claim and desire to secure by Letters Patent is:—

1. The method of resolving an emulsion containing an aqueous phase and an oleaginous phase which consists in adding to the emulsion a quantity of solid matter consisting of extremely finely divided sharp particles of air separated rock dust having a large surface area in proportion to their weight and being more easily wetted by water than by oil, said quantity being sufficient to form with said aqueous phase a relatively stiff mass capable of sinking through said oleaginous phase, and in settling out said stiff mass from said oleaginous phase.

2. The method of resolving an emulsion including an aqueous phase and an oleaginous phase which consists in adding to the emulsion a quantity of solid matter equal to at least one and one half times by weight the amount of water present in the emulsion and consisting of extremely finely divided sharp particles of air separated rock dust having a large surface area in proportion to their weight and being more easily wetted by water than oil, said particles having been previously employed at least twice in a demulsifying treatment, separating out a large proportion of said aqueous phase, adding a further quantity of said emulsion, heating the mixture thus formed to cause a reversal of the phases and settling out the resulting agglomerate of said particles and said aqueous phase from said oleaginous phase.

3. The method of resolving an emulsion including an aqueous phase and an oleaginous phase which consists in rendering the emulsion faintly acid, adding thereto a quantity of solid matter equal to at least one and one half times by weight the amount of water present in the emulsion and consisting of extremely finely divided sharp particles of air separated rock dust having a large surface area in proportion to their weight and being more easily wetted by water than oil, and in settling out the resulting agglomerate of said particles and said aqueous phase from said oleaginous phase.

4. The method of resolving an emulsion including an aqueous phase and an oleaginous phase which consists in blending together a plurality of emulsions containing different proportions of water, adding to said blend a quantity of solid matter equal to at least one and one half times by weight the amount of water present in said blend and consisting of extremely finely divided sharp particles of air separated rock dust having a large surface area in proportion to their weight and being more easily wetted by water than oil, and in settling out the resulting agglomerate of said particles and said aqueous phase from said oleaginous phase.

5. The method of resolving an emulsion including an aqueous phase and an oleaginous phase which consists in adding to the emulsion a quantity of finely divided granite dust equal to at least 20% by weight of the emulsion and in settling out the resulting agglomerate of said granite dust and said aqueous phase from said oleaginous phase.

6. The method of resolving an emulsion including an aqueous phase and an oleaginous phase which consists in adding to the emulsion a quantity of finely divided granite dust equal to at least 20% by weight of the emulsion, separating out a large proportion of said aqueous phase, adding a further quantity of said emulsion, heating the mixture thus formed to cause a reversal of the phases and settling out the resulting agglomerate of said granite dust and said aqueous phase from said oleaginous phase.

7. The method of resolving an emulsion including an aqueous phase and an oleaginous phase which consists in rendering the emulsion faintly acid, adding thereto a quantity of finely divided granite dust equal to at least 20% of the weight of the emulsion, and settling out the resulting agglomerate of said particles and said aqueous phase from said oleaginous phase.

8. The method of resolving an aqueous emulsion containing more than 65% of oil, which consists in dispersing throughout the emulsion a quantity of finely divided granite dust equal to at least 20% by weight of the emulsion, heating the mixture thus formed, and settling out the oleaginous phase of the emulsion from the resulting agglomerate of said granite dust and said aqueous phase.

9. The method of resolving an emulsion including an aqueous phase and an oleaginous phase said aqueous phase constituting at least 10% of the whole, which consists in adding a quantity of finely divided granite dust, substantially in proportion of two parts by weight of granite dust to one part of water in said emulsion and in separating out the resulting agglomerate of said granite dust and said aqueous phase from said oleaginous phase.

In witness whereof we hereunto subscribe our names this 7th day of February, A. D. 1927.

HERBERT WILLIAM ROBINSON.
DERIC WILLIAM PARKES.